(12) United States Patent
Bunker et al.

(10) Patent No.: US 10,815,789 B2
(45) Date of Patent: Oct. 27, 2020

(54) IMPINGEMENT HOLES FOR A TURBINE ENGINE COMPONENT

(71) Applicant: General Electric Company, Schenectady, NY (US)

(72) Inventors: Ronald Scott Bunker, West Chester, OH (US); Jason Randolph Allen, Loveland, OH (US)

(73) Assignee: General Electric Company, Schenectady, NY (US)

( * ) Notice: Subject to any disclaimer, the term of this patent is extended or adjusted under 35 U.S.C. 154(b) by 917 days.

(21) Appl. No.: 15/043,512

(22) Filed: Feb. 13, 2016

(65) Prior Publication Data
US 2017/0234139 A1    Aug. 17, 2017

(51) Int. Cl.
| | |
|---|---|
| *F01D 5/18* | (2006.01) |
| *F01D 9/06* | (2006.01) |
| *F01D 9/04* | (2006.01) |
| *F01D 11/08* | (2006.01) |
| *F01D 25/12* | (2006.01) |
| *F02C 7/18* | (2006.01) |

(Continued)

(52) U.S. Cl.
CPC ............ *F01D 5/187* (2013.01); *F01D 9/041* (2013.01); *F01D 9/065* (2013.01); *F01D 11/08* (2013.01); *F01D 25/12* (2013.01); *F02C 7/18* (2013.01); *F23R 3/002* (2013.01); *F23R 3/42* (2013.01); *F05D 2220/32* (2013.01); *F05D 2240/11* (2013.01); *F05D 2240/35* (2013.01); *F05D 2250/21* (2013.01); *F05D 2250/232* (2013.01); *F05D 2250/323* (2013.01); *F05D 2260/201* (2013.01); *F23R 2900/03044* (2013.01); *Y02T 50/672* (2013.01); *Y02T 50/676* (2013.01)

(58) Field of Classification Search
CPC .......... F01D 5/186; F01D 5/187; F01D 9/041; F01D 9/065; F01D 11/08; F01D 25/12; F02C 7/18; F23R 3/002; F23R 3/42; F23R 2900/03044
USPC .......................................................... 60/752
See application file for complete search history.

(56) References Cited

U.S. PATENT DOCUMENTS

| | | |
|---|---|---|
| 3,777,484 A | 12/1973 | Dibelius et al. |
| 5,077,969 A | 1/1992 | Liang et al. |

(Continued)

FOREIGN PATENT DOCUMENTS

| | | |
|---|---|---|
| EP | 2 787 174 A2 | 10/2014 |
| EP | 2 949 866 A1 | 12/2015 |

OTHER PUBLICATIONS

Extended European Search Report and Opinion issued in connection with corresponding EP Application No. 17155340.7 dated Jul. 6, 2017.

*Primary Examiner* — Jesse S Bogue
*Assistant Examiner* — Loren C Edwards
(74) *Attorney, Agent, or Firm* — McGarry Bair PC

(57) ABSTRACT

An apparatus for an impingement hole for an engine component of a gas turbine engine includes an impingement baffle. The impingement baffle is spaced from an impingement surface and includes a plurality of impingement holes for providing an impingement flow to the impingement surface. The impingement holes can have an angled upstream edge such that an inlet has a greater cross-sectional area than an outlet. The walls of the impingement holes can have a hood to provide a higher shear flow content to minimize dust accumulation on the impingement surface.

20 Claims, 7 Drawing Sheets

(51) Int. Cl.
 *F23R 3/00* (2006.01)
 *F23R 3/42* (2006.01)

(56) References Cited

U.S. PATENT DOCUMENTS

| | | | |
|---|---|---|---|
| 5,271,715 A | 12/1993 | Zelesky et al. | |
| 5,326,224 A | 7/1994 | Lee et al. | |
| 5,388,765 A | 2/1995 | Hill et al. | |
| 5,660,525 A | 8/1997 | Lee et al. | |
| 6,000,908 A | 12/1999 | Bunker | |
| 6,234,755 B1 | 5/2001 | Bunker et al. | |
| 6,494,044 B1 * | 12/2002 | Bland | F01D 9/023 60/757 |
| 6,554,563 B2 | 4/2003 | Noe et al. | |
| 7,798,776 B1 | 9/2010 | Liang | |
| 7,891,194 B2 * | 2/2011 | Biebel | F23R 3/06 60/752 |
| 8,281,600 B2 * | 10/2012 | Chen | F02C 7/18 60/772 |
| 8,522,558 B1 | 9/2013 | Xu | |
| 8,628,292 B2 | 1/2014 | Maltson | |
| 8,657,576 B2 | 2/2014 | Tibbott et al. | |
| 8,850,828 B2 | 10/2014 | Mongillo, Jr. et al. | |
| 9,151,173 B2 | 10/2015 | Maldonado | |
| 2010/0115967 A1 * | 5/2010 | Maltson | F01D 5/186 60/806 |
| 2010/0229564 A1 * | 9/2010 | Chila | F23R 3/06 60/752 |
| 2010/0251723 A1 | 10/2010 | Chen et al. | |
| 2015/0315930 A1 | 11/2015 | Koonankeil et al. | |

\* cited by examiner

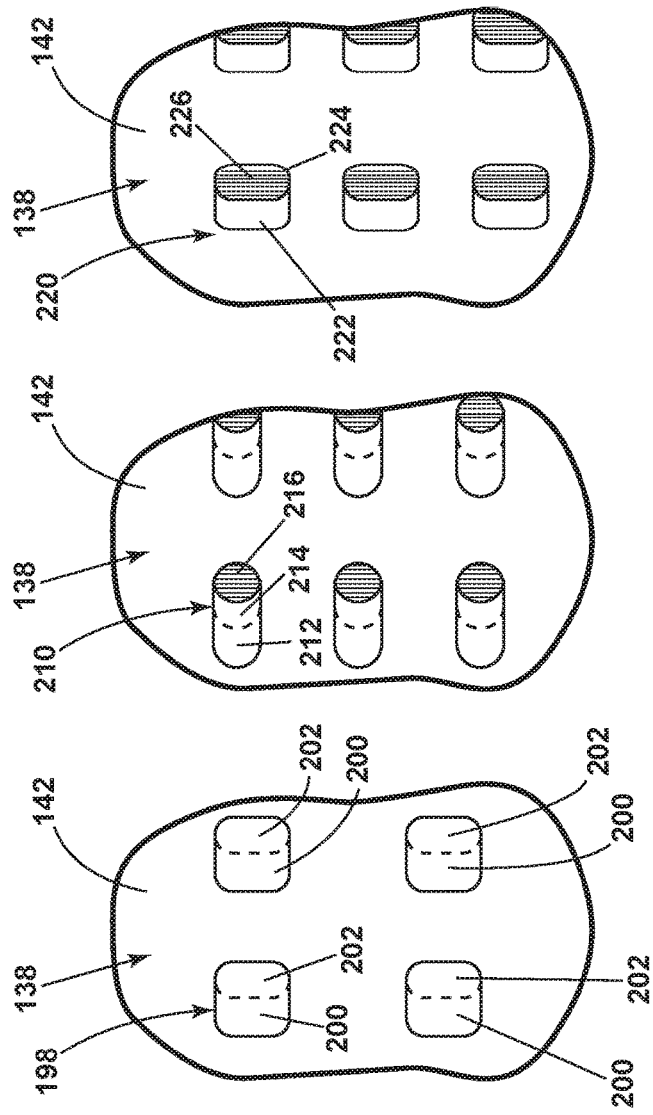
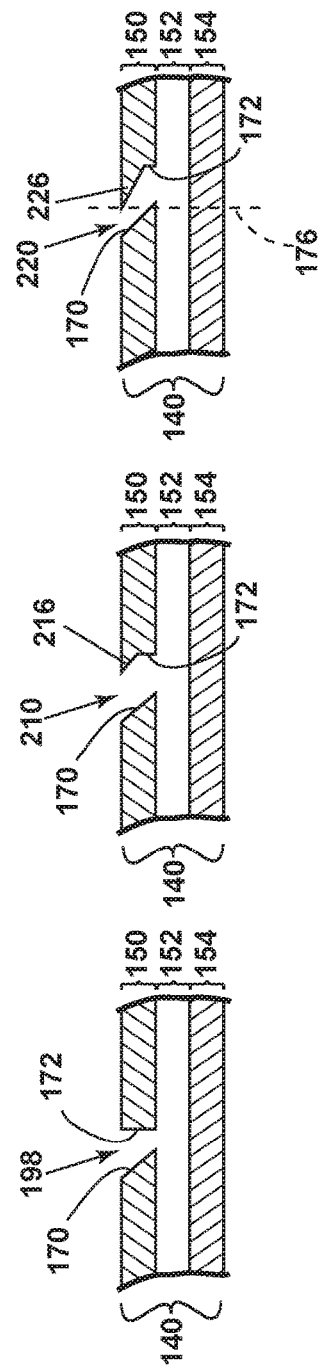

IMPINGEMENT HOLES FOR A TURBINE ENGINE COMPONENT

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Engine components can include an impingement baffle with a plurality of impingement holes to impinge cooling air onto a component surface to provide enhanced cooling. Typical impingement holes are disposed orthogonal to the surface upon which the cooling air is impinging, which leads to accumulation of dust or particular matter on the impinged surface.

BRIEF DESCRIPTION OF THE INVENTION

In one aspect, embodiments of the invention relate to an engine component for a gas turbine engine which generates a hot combustion gas flow and provides a cooling fluid flow includes an outer wall separating the hot combustion gas flow from the cooling fluid flow and having a hot surface facing the combustion gas flow and a cooling surface facing the cooling fluid flow. The engine component further includes an impingement baffle spaced from the cooling surface, at least one impingement hole provided in the impingement baffle having an inlet and an outlet for providing the cooling fluid flow to the cooling surface, and a passage fluidly coupling the inlet to the outlet having a first wall and a second wall defining a linear passage centerline between the inlet and the outlet. The first wall is disposed at an angle relative to an axis orthogonal to the cooling surface and the second wall being orthogonal to the cooling surface.

In another aspect, embodiments of the invention relate to an engine component for a gas turbine engine, which generates a hot combustion has flow and provides a cooling fluid flow, includes an outer wall separating the hot combustion gas flow from the cooling fluid flow and having a hot surface facing the hot combustion gas flow and a cooling surface facing the cooling fluid flow. The engine component further includes an impingement baffle spaced form the cooling surface, at least one impingement hole provided in the impingement baffle having an inlet and an outlet, a passage fluidly coupling the inlet to the outlet and having an angled wall and a straight wall, and a hood disposed on the straight wall.

In yet another aspect, embodiments of the invention relate to an engine component for a gas turbine engine having an impingement baffle spaced form an impingement surface and the impingement baffle includes at least one impingement hole having an inlet and an outlet with a hood extending into the inlet.

BRIEF DESCRIPTION OF THE DRAWINGS

In the drawings:

FIGS. 8A-8C illustrate top views of alternative embodiments for the impingement holes.

FIGS. 9A-9C illustrate side views respective of the top views of FIGS. 7A-7C of the impingement holes.

DESCRIPTION OF EMBODIMENTS OF THE INVENTION

Figure 1:
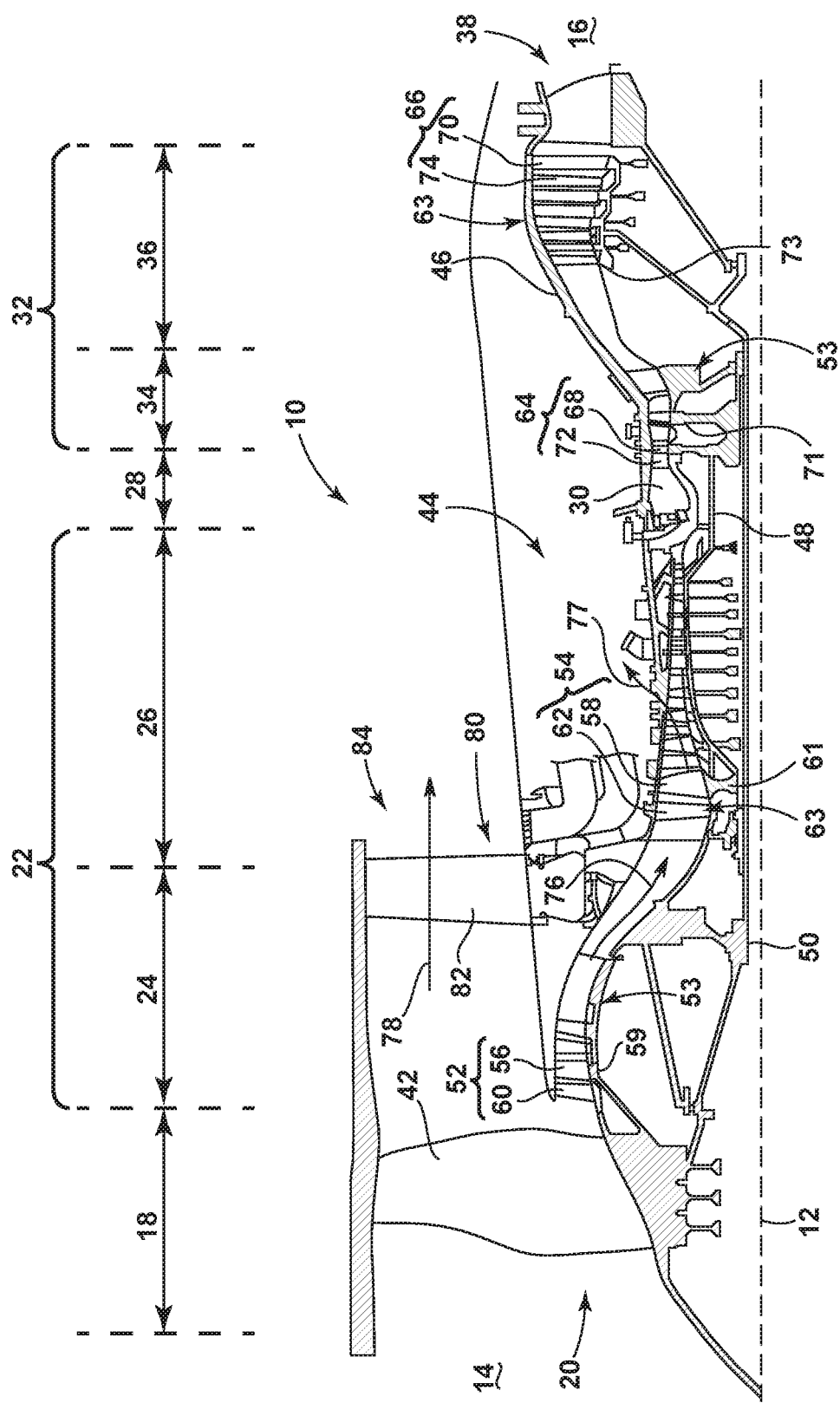
FIG. 1 is a schematic cross-sectional diagram of a gas turbine engine for an aircraft.

The described embodiments of the present invention are directed to impingement holes disposed on an impingement baffle of a component of a gas turbine engine. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
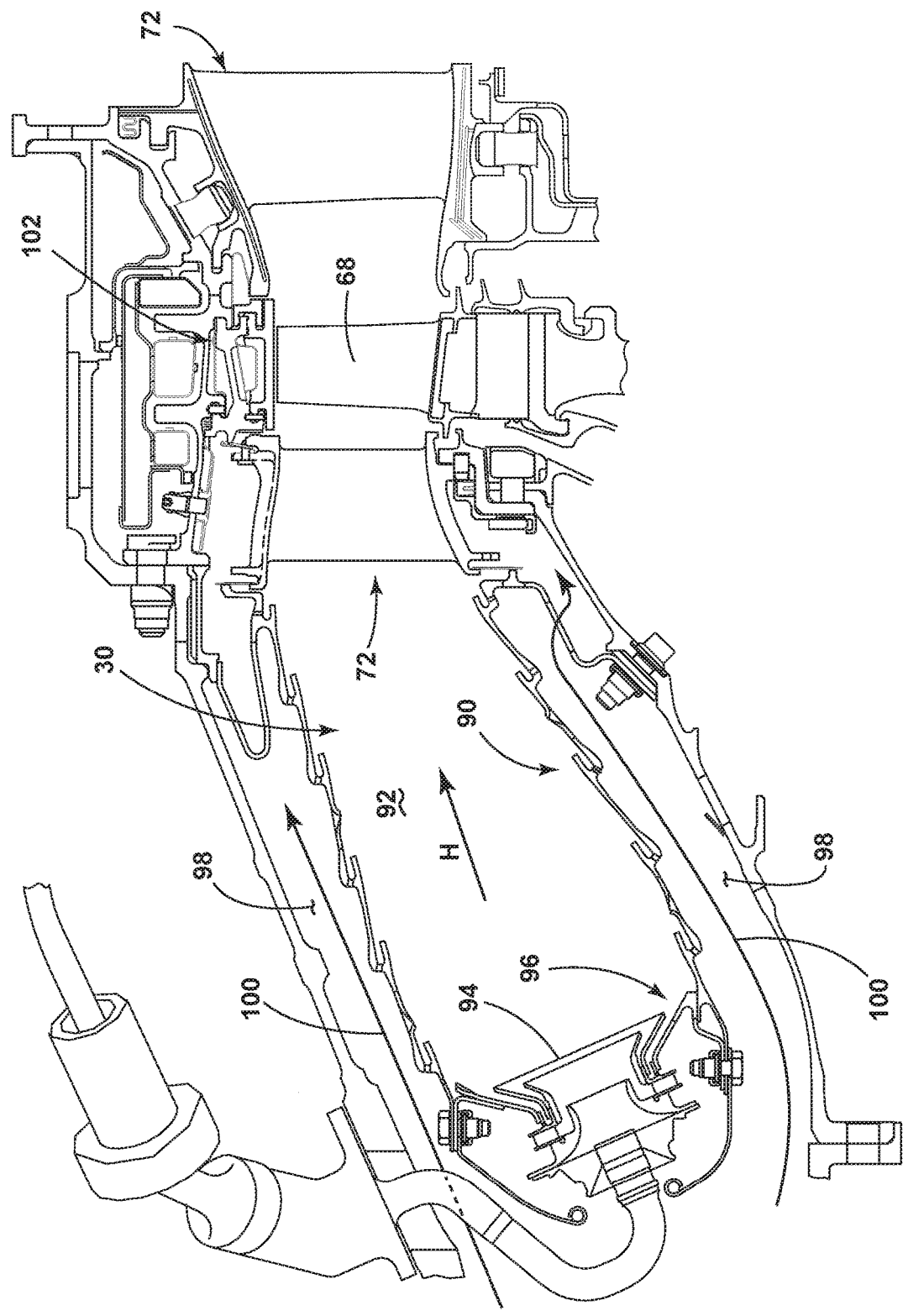
FIG. 2 is a side section view of a combustor of the gas turbine engine of FIG. 1 illustrating multiple engine components.

FIG. 2 is a side section view of the combustor 30 and HP turbine 34 of the engine 10 from FIG. 1. The combustor 30 includes a combustor liner 90 defining a combustion chamber 92. A combustor nozzle 94 provides a flow of gas or an air/gas mixture for combusting within the combustion chamber 92. A deflector 96 is provided at the intersection between the nozzle 94 and the combustion liner 90 for directing the combusted flow aft. A cooling flow 100 can bypass the combustor 30 through an annular bypass channel 98, being provided to one or more engine components requiring cooling.

Adjacent to the turbine blade 68 of the turbine 34 in the axial direction are sets of static turbine vanes 72 forming nozzles. The nozzles turn combustion gas so that the maximum energy can be extracted by the turbine 34. A shroud assembly 102 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 has a cooled wall in which various embodiments disclosed further herein can be utilized. Some non-limiting examples of the engine component having a film-cooled wall can include the blades 68, 70, vanes or nozzles 72, 74, combustor deflector 96, combustor liner 90, or shroud assembly 102, described in FIGS. 1-2. Other non-limiting examples where film cooling is used include turbine transition ducts, struts, and exhaust nozzles.

Figure 3:
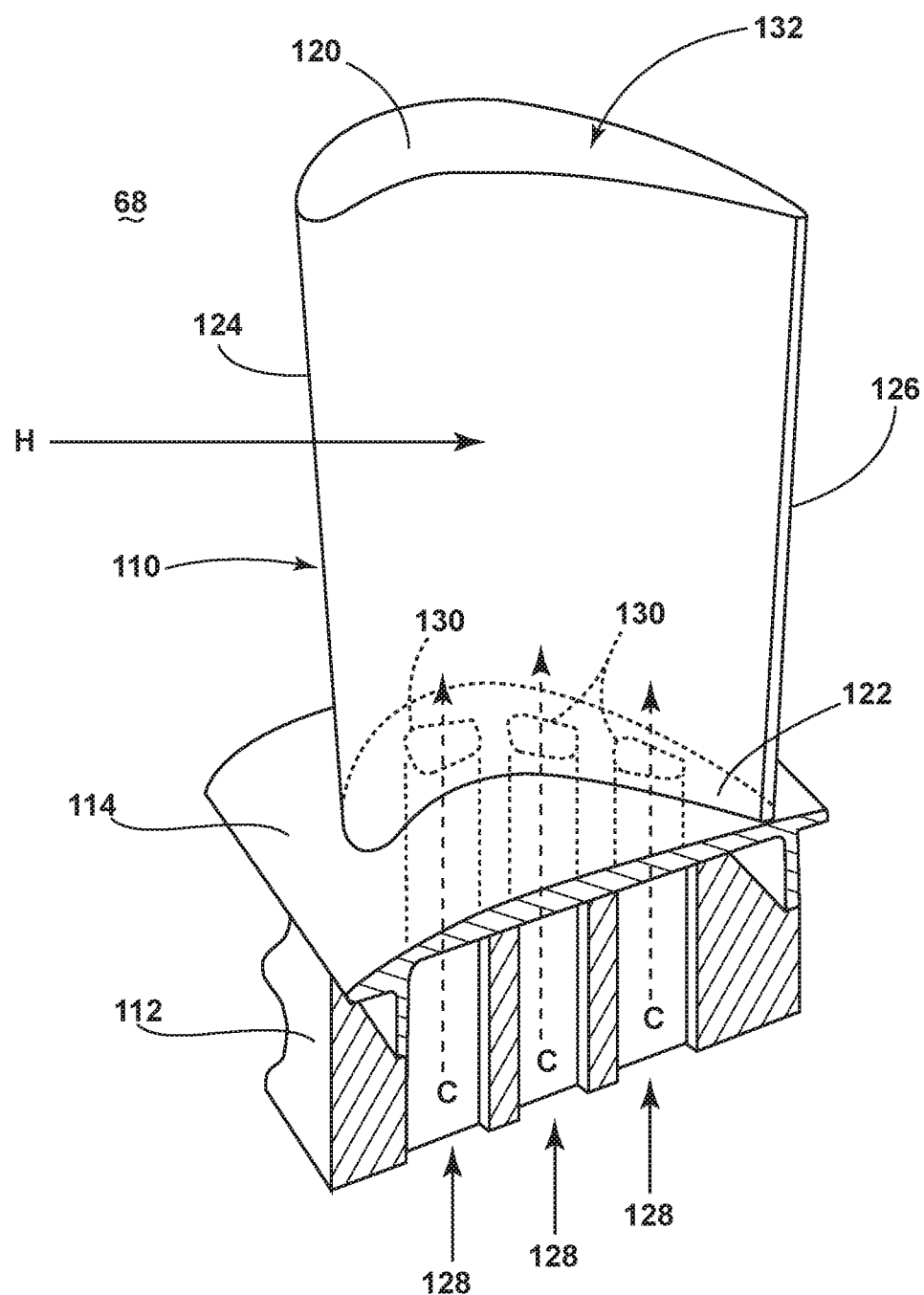
FIG. 3 is a perspective view of an engine component in the form of a turbine blade of the engine of FIG. 2 with cooling air inlet passages.

FIG. 3 is a perspective view of an engine component in the form of one of the turbine blades 68 of the engine 10 of FIG. 1. It should be understood that the blade 68 as described herein is exemplary, and the concepts disclosed extend to additional engine components and are not limited to the blade 68. The aspects of the invention are discussed in relation to a blade 68 to facilitate the reader's understanding of the invention. The turbine blade 68 includes a dovetail 112 and an airfoil 110. The airfoil 110 extends from a tip 120 to a root 122 defining a span-wise direction and extends from a leading edge 124 to a trailing edge 126 in a chord-wise direction. The dovetail 112 further includes a platform 114 integral with the airfoil 110 at the root 122, which helps to radially contain the turbine airflow. The dovetail 112 can be configured to mount to a turbine rotor disk 51 on the engine 10. The dovetail 112 comprises at least one inlet passage 128, exemplarily shown as three inlet passages 128, each extending through the dovetail 112 to provide internal fluid communication with the airfoil 110 at one or more passage outlets 130. It should be appreciated that the dovetail 112 is shown in cross-section, such that the inlet passages 128 are housed within the body of the dovetail 112.

The airfoil 110 can further define an interior 132, such that a flow of cooling fluid C can be provided through the inlet passages 128 and to the interior 132 of the airfoil 110. Thus, the flow of cooling fluid flow C can be fed through the inlet passages 128, exiting the outlets 130, and passing within the interior 132 of the airfoil. A flow of hot gas H can pass external of the airfoil 110, while the cooling fluid flow C moves within the interior 132.

The inlet 162 and the outlet 164 can each define a cross-sectional area. The inlet 162 can have a greater cross-sectional area than the outlet 164. Additionally, the outlet can have an effective outlet diameter, or length, being greater than or equal to the thickness of the impingement baffle 150.

Figure 4:
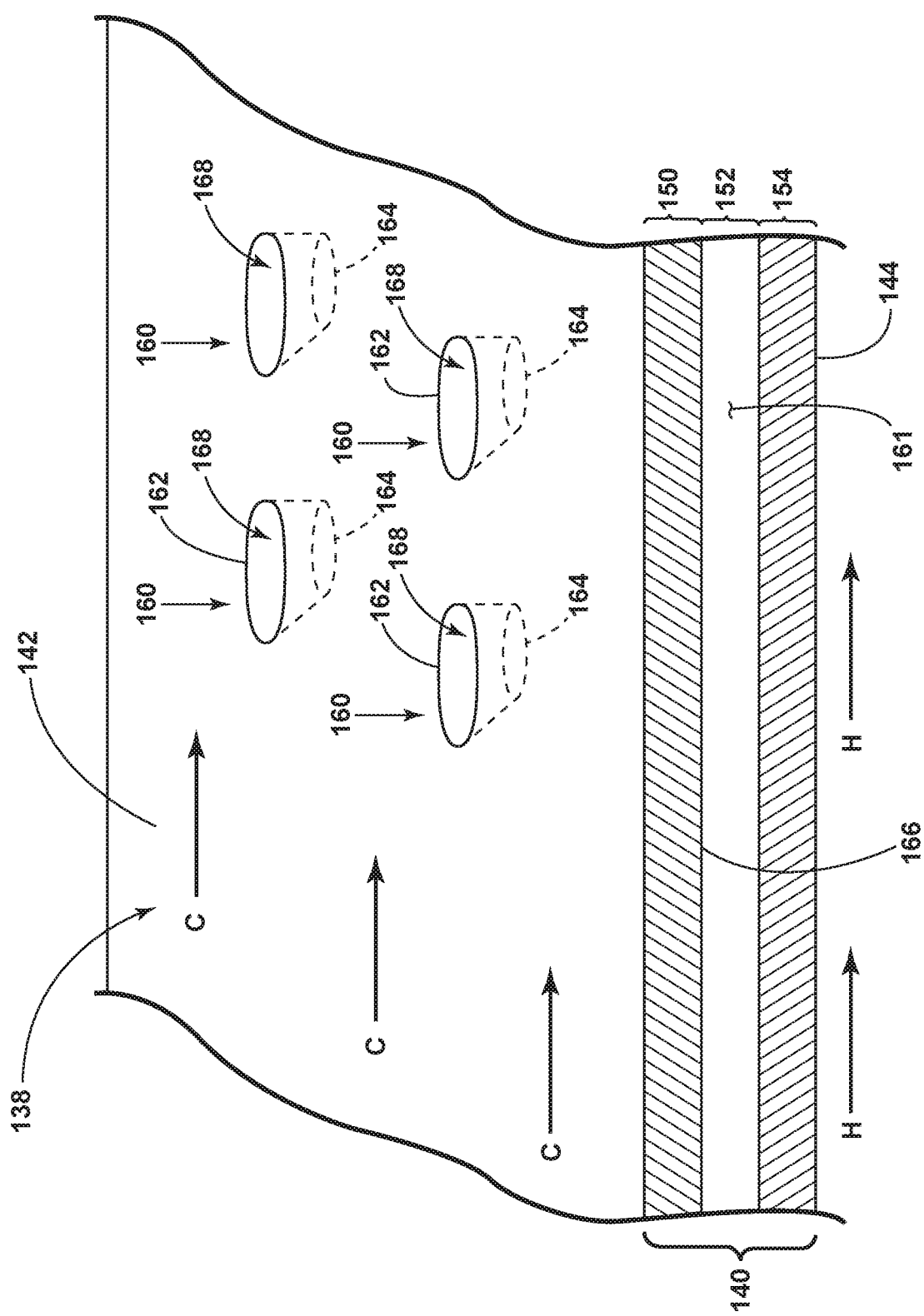
FIG. 4 is a perspective view of a portion of the engine component of FIG. 3 having an impingement baffle with multiple impingement holes.

FIG. 4 is a schematic view showing a portion of an engine component 138 of the engine 10 from FIG. 1, which can comprise a portion the blade 68 of FIG. 3. The engine component 138 can be disposed in the flow of hot gases H within the engine 10. The cooling fluid flow C can be supplied to cool the engine component 138 internally. As discussed above with respect to FIGS. 1-2, in the context of a turbine engine, the cooling fluid flow C can be any cooling fluid, but is most commonly at least one of ambient air supplied by the fan 20 which bypasses the engine core 44, fluid discharged from the LP compressor 24, or fluid discharged from the HP compressor 26.

The engine component 138 includes a wall 140 having a hot surface 144 facing the hot gas flow H and a cooling surface 142 facing the cooling fluid flow C. In the case of the gas turbine engine 10, the hot surface 144 can be exposed to gases having temperatures in the range of 1000° C. to 2000° C., or more. Suitable materials for the wall 140 include, but are not limited to, steel, refractory metals such as titanium, or super alloys based on nickel, cobalt, or iron, and ceramic matrix composites. The engine component 138 can define the interior 132 of the airfoil 110 of FIG. 3, comprising the cooling surface 142. The hot surface 144 can be an exterior surface of the engine component 138, such as a pressure or suction side of the airfoil 110.

The wall 140 can be two-part, including an impingement baffle 150 and an outer wall 154 being spaced from one another to define a gap 152 therebetween. The two-part wall can be either integrally formed, such as cast or additively manufactured, or can be two assembled pieces, such as brazed together. The engine component 138 further includes multiple impingement holes 160 arranged on the cooling surface 142. Each impingement hole 160 is a shaped aperture in the cooling surface 142 extending toward the outer wall 154. As such, the impingement holes 160 provide fluid communication between the interior 132 of the engine component 138 and the gap 152, providing the cooling fluid flow C to impinge on an interior impingement surface 161 of the outer wall 154. Each impingement hole 160 further includes an inlet 162 and an outlet 164 with the inlet 162 formed in the cooling surface 142 and the outlet 164 formed on the underside 166 of the impingement baffle 150. An impingement passage 168 is defined between the inlet 162 and the outlet 164 to fluidly couple the interior 132 to the gap 152.

Figure 5:
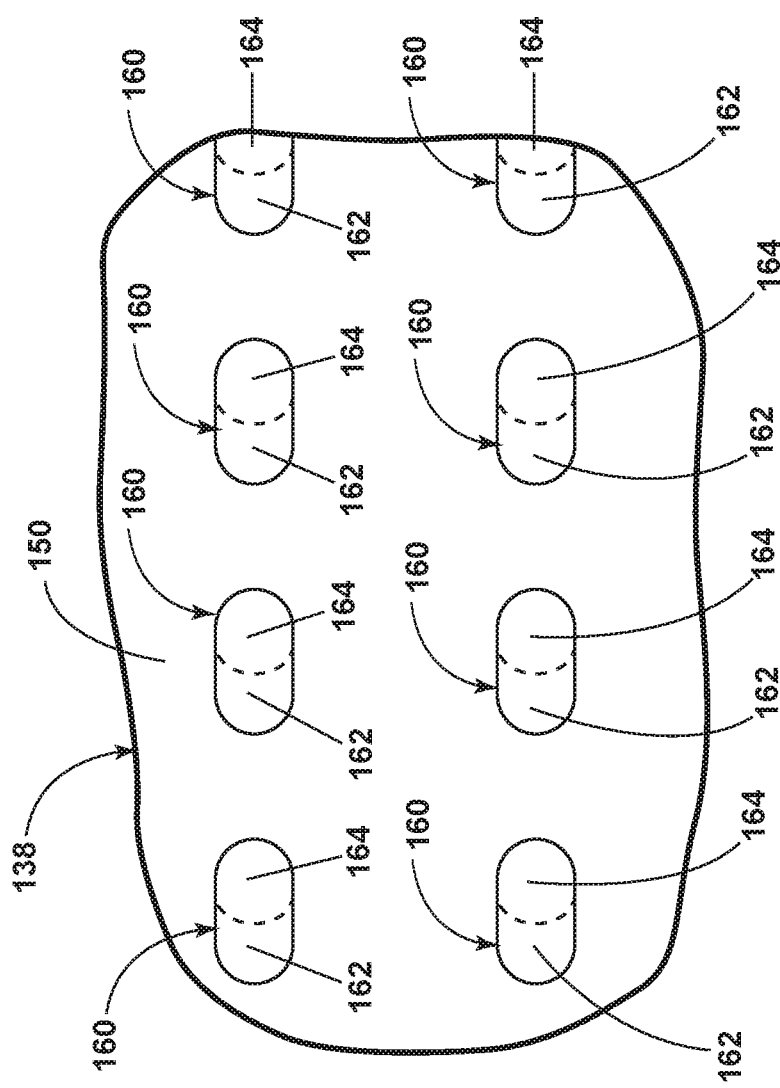
FIG. 5 is a top view illustrating an outlet of the impingement holes being aligned with a portion of an inlet.

Referring to FIG. 5, illustrating a top-down view of the engine component 138, the size of the inlet 162 is larger than that of the outlet 164. As such, a portion of the inlet 162 is occupied by the impingement baffle 150. Looking now at FIG. 6, a side view of the wall 140 illustrates the profile of the impingement baffles 150 to illustration the occupied portion of FIG. 5. The impingement hole 160 further includes a first upstream wall 170 and a second downstream wall 172. The upstream wall 170 can be linear defining an upstream wall axis 174. The upstream wall axis 170 is offset from an impingement axis 176 being orthogonal to the impingement surface 161 to define an upstream wall angle 178. As such, the upstream wall angle 178 can be disposed such that the inlet 162 has a greater cross-sectional area than the outlet 164 and the impingement passage 168 includes a decreasing cross-sectional area through the impingement hole 160.

The linear upstream and downstream walls 170, 172 can define a linear impingement centerline 180 through the impingement hole 160. A centerline angle 182 can be defined by the impingement centerline 180 relative to the impingement axis 176. A flow passing through the impingement hole 160 at an angle determined by the velocity and pressure of the cooling fluid C as well as the upstream wall angle 178 and the centerline angle 182. This results in a higher shear flow component through the impingement holes 160 and impinging on the impingement surface 161, as compared to an entirely normal flow component, resulting in lower dust accumulation rates along the impingement surface 161.

Additionally, a length can be defined between the upstream and downstream walls 170, 172 at the inlet 162 and the outlet 164. The length at the inlet 162 can be greater than the length at the outlet 164. The length at the outlet 164 can be greater than or equal to the thickness of the impingement baffle 150.

Figure 6:
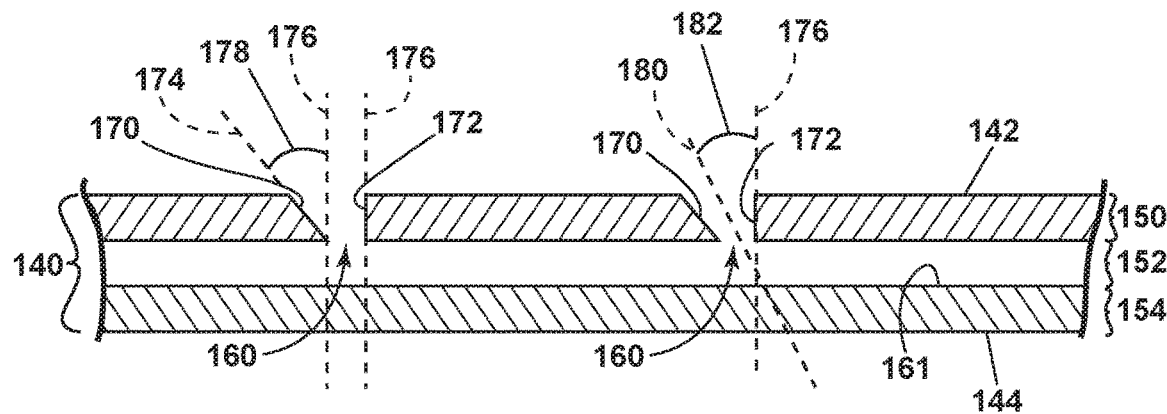
FIG. 6 is a side view of the impingement baffle of FIG. 4 illustrating an angled wall for the impingement holes.

It should be appreciated that the upstream and downstream walls 170, 172 are described relative to a cross-sectional profile as shown in FIG. 6. For curved impingement holes 160, such as circles or ovals, the first and second walls 170, 172 are integral, such that the angle of the first wall 170 changes transitioning to the second wall 172, where the wall becomes orthogonal to the impingement surface 161. Furthermore, it should be appreciated that the holes can be asymmetric, or slightly off-set due to imperfections or manufacturing variations.

Figure 7:
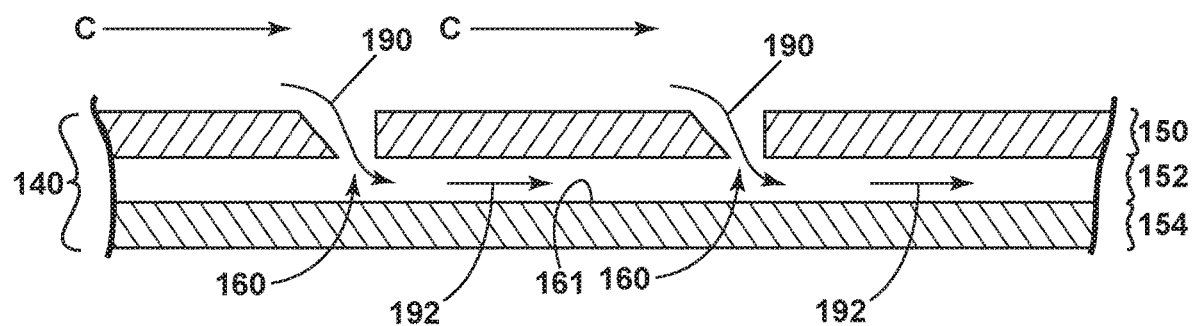
FIG. 7 is the side view of FIG. 6 illustrating an impingement airflow passing through the impingement holes.

Referring to FIG. 7, an impingement flow 190 will pass through the impingement holes 160 at an angle, as opposed to directly at the impingement surface 161, which can be determined by the velocity and pressure of the cooling fluid flow C and be a function of the upstream wall angle 178 and the centerline angle 182 of FIG. 6. The impingement flow 190 moving at the angle will result in lower dust accumulation rates along the impingement surface 161 when passing as an impingement flow 192.

Referring to FIGS. 8A-8C different embodiments for the impingement holes are shown. In FIG. 8A, an impingement hole 198 can have a rounded square or a rounded quadrilateral shape. As illustrated an inlet 200 has a rounded square shape, while an outlet 202, having a smaller cross-sectional area than the inlet 200, has a rounded rectangular shape. It should be appreciated that the impingement hole, inlets, outlets, or passages as described herein can have a shape being rounded, oval, circular, arcuate, square, rectangular, quadrilateral or otherwise, or any combination thereof in non-limiting examples.

Looking now at FIG. 8B, an impingement hole 210 can further include an inlet 212, an outlet 214, and a hood 216, shown as the lined element, extending into a portion of the inlet 212. In this top-down view, the hood 216 occupies a portion of the inlet 212 and overhangs at least a portion of the outlet 214. The hood 216, similar to the inlets and outlets, can be any shape including but not limited to rounded, oval, circular, arcuate, square, rectangular, quadrilateral or otherwise, or any combination thereof. As such, the shape of the inlet, outlet, or passage of the impingement hole can be shaped based upon the inclusion of the hood 216. For example, the hood 216 as shown in FIG. 8B is a circular shape. Thus, as the hood 216 extends into a portion of the inlet 212, the inlet 212 has an oval shape missing a circular portion occupied by the hood 216. Thus, the shaping of the impingement holes can be respective of a hood 216 extending into a portion of the passage.

In another example, looking at FIG. 8C, an impingement hole 220 can have a hood 226 with a rounded rectangular shape or an oval shape extending into a portion of an inlet 222. The hood 226 overhangs a portion of the outlet 224, such that some or none of the outlet 224 can be aligned with the inlet 222 resultant of the position and size of the hood 226.

Referring to FIGS. 9A-9C, side views of FIGS. 8A-8C are shown, respectively. Looking at FIG. 9A, the rounded quadrilateral shape of the impingement hole 198 has the same profile as the circular impingement hole 160 of FIG. 6, with an angled upstream wall 170 and a straight downstream wall 172.

FIG. 9B illustrates the profile of the hood 216 of FIG. 8B. The hood 216 extends from the downstream wall 170 into the inlet 212, overlying at least a portion of the outlet 214. As such, a centerline of the impingement hole 210 is non-linear, while providing an angle at the inlet 212 to provide an impinging fluid at an angle against the impingement surface 161 to minimize dust collection thereon.

FIG. 9C illustrates the hood 226 fully overlying the outlet 224. No portion of the inlet 222 overlies a portion of the outlet 224, relative to the impingement axis 176 orthogonal to the impingement surface 161. In the embodiment shown in FIG. 9C, the cross-sectional area of the inlet 222 can be less than that of the outlet 224, as the hood 226 occupies a significant portion of the inlet 222.

The hood can overlie a portion of the outlet, dividing the outlet into an overlain portion and a second portion that is not overlain. As such, the overlain portion can be greater than or equal to the second portion.

It should be appreciated that the hood 216, 226 can extend into the passage and the inlet 212, 222 of the impingement hole 210, 220 from a portion of the downstream wall 172. The hood 216, 226 can be flush with the cooling surface 142 or can be spaced therefrom. Furthermore, the hood 216, 226 can overlie at least a portion of the outlet 214, 224, and can overlie the entire outlet and even a portion of the upstream wall 170. The hood 216, 226 is contoured and shaped to provide for better directionality of the impingement flow moving through the impingement hole 210, 220. The hoods 216, 226 as shown have a triangular profile, however, can have include different shapes such as an arcuate, curved, linear, non-linear, circular, quadrilateral, unique, or otherwise, or any combination thereof in non-limiting examples to provide such a directionality.

It is further contemplated that the hood can be disposed along the upstream wall 170 similar to any disclosed orientation on the downstream wall 172.

The embodiments as described herein provide for injecting an impinging fluid toward an impingement surface having both a radial and a tangential component. Thus, an angled impingement flow can be delivered to the impingement surface without the need for angled impingement holes. The angled impingement flow delivers a higher shear flow content for the impingement flow which decreases dust accumulation rates on the impingement surface. Minimizing the dust accumulation can increase the service life of engine components needing impingement cooling as well as minimizing servicing during component lifetime.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a turbine engine, which generates a hot combustion gas flow, and provides a cooling fluid flow, comprising:
   an outer wall separating the hot combustion gas flow from the cooling fluid flow and having a hot surface along with the hot combustion gas flow and an impingement surface facing the cooling fluid flow;
   an impingement baffle spaced from the impingement surface having a cooling surface and an underside facing the impingement surface;
   at least one impingement hole provided in the impingement baffle having an inlet at the cooling surface and an outlet at the underside for providing the cooling fluid flow from the cooling surface; and
   a passage fluidly coupling the inlet to the outlet and having a first, upstream wall and a second, downstream wall defining a straight, linear passage centerline extending fully between the inlet and the outlet, with the second, downstream wall being substantially orthogonal to the cooling surface, and the first, upstream wall being non-parallel to the second, downstream wall.

2. The engine component of claim 1 wherein the inlet has a greater cross-sectional area than the outlet.

3. The engine component of claim 2 wherein the impingement baffle has a thickness and the inlet has a maximum inlet cross-sectional length greater than the thickness of the impingement baffle.

4. The engine component of claim 3 wherein the outlet has an effective outlet diameter being greater than or equal to the thickness of the impingement baffle.

5. The engine component of claim 4 wherein the inlet has an oval shape and the outlet has a circular shape.

6. The engine component of claim 4 wherein the inlet has a rounded square shape and the outlet has a rounded rectangular shape.

7. An engine component for a turbine engine, which generates a hot combustion gas flow, and provides a cooling fluid flow, comprising:
   an outer wall separating the hot combustion gas flow from the cooling fluid flow and having a hot surface facing the hot combustion gas flow and a cooling surface facing the cooling fluid flow;
   an impingement baffle having a first surface and a second surface opposite from the first surface, with the second surface facing and spaced from the cooling surface of the outer wall;
   at least one impingement hole provided in the impingement baffle having an inlet and an outlet with a passage defining a passage centerline fluidly coupling the inlet to the outlet, and having an upstream angled wall extending between the first surface and the second surface defining the passage centerline disposed at an angle offset from an axis orthogonal to the cooling surface, and having a straight, downstream wall at least partially defining the passage and disposed orthogonal to the cooling surface; and
   a hood formed in the impingement baffle and extending from the straight, downstream wall into the passage, the hood spaced from the outlet and discontinuous with the straight, downstream wall, and overlying at least a first portion of the outlet.

8. The engine component of claim 7 wherein the hood at least partially defines the inlet.

9. The engine component of claim 8 wherein the hood does not overlie a second portion of the outlet.

10. The engine component of claim 9 wherein the first portion of the outlet is greater than or equal to the second portion of the outlet.

11. The engine component of claim 7 wherein the inlet has a length between the angled and straight walls greater than that of a length of the outlet between the angled and straight walls.

12. The engine component of claim 11 wherein the length of the outlet between the angled and straight walls is greater than or equal to a thickness of the impingement baffle.

13. The engine component of claim 7 wherein a centerline through the at least one impingement hole is non-linear.

14. The engine component of claim 7 wherein the inlet is a deformed oval having a deformation occupied by the hood and the outlet is a circular shape.

15. The engine component of claim 7 wherein the inlet and the outlet are rounded rectangular shapes.

16. The engine component of claim 7 wherein the impingement baffle has a cooling surface and the hood is flush with the cooling surface of the impingement baffle.

17. The engine component of claim 7 wherein the impingement baffle has a cooling surface and the hood is spaced from the cooling surface of the impingement baffle.

18. An engine component for a turbine engine having an impingement baffle spaced from an impingement surface and the impingement baffle includes at least one impingement hole having an inlet and an outlet defining a passage fluidly coupling the inlet to the outlet and having a first, upstream wall and a second, downstream wall defining a straight, linear passage centerline extending fully between the inlet and the outlet, with the second, downstream wall being substantially orthogonal to the impingement surface, and the first, upstream wall being non-parallel to the second, downstream wall, with a hood extending into the passage and overlying at least a first portion of the outlet and spaced from the outlet.

19. The engine component of claim 18 wherein the hood does not overlie a second portion of the outlet.

20. The engine component of claim 19 wherein the first portion of the outlet is greater than or equal to the second portion of the outlet.

* * * * *